June 21, 1938.  A. A. JOHNSON  2,121,525
FENDER GUIDE
Filed Feb. 21, 1936
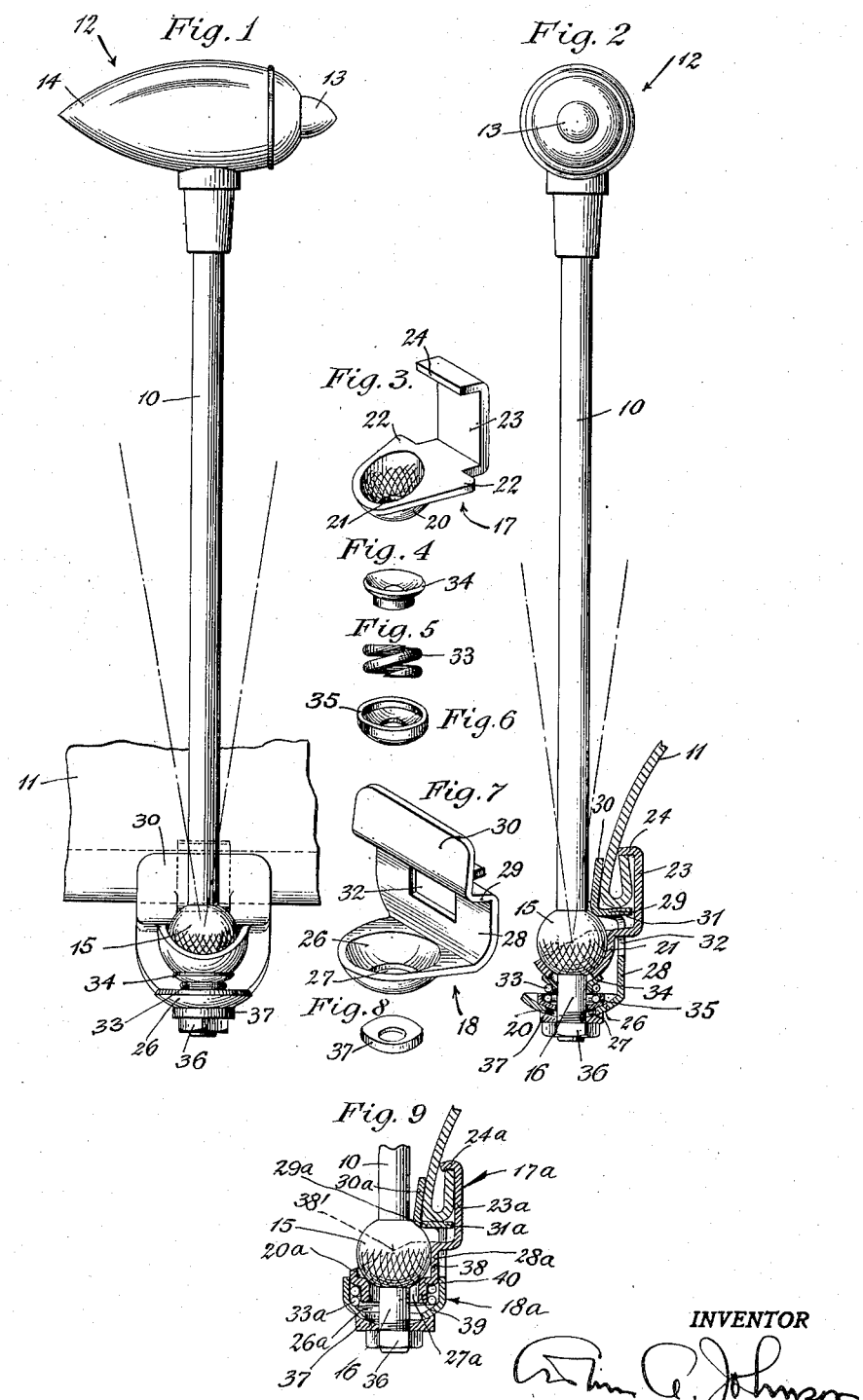
INVENTOR
Arthur A. Johnson Patented June 21, 1938

2,121,525

UNITED STATES PATENT OFFICE 2,121,525

FENDER GUIDE

Arthur A. Johnson, Bridgeport, Conn., assignor to Casco Products Corporation, Bridgeport, Conn., a corporation of Connecticut Application February 21, 1936, Serial No. 65,057

10 Claims. (Cl. 248—43)

This invention relates to fender guides for automobiles.

In order for a guiding attachment on fenders to function correctly in assisting the operator of an automobile to judge distances, there must be provided a rod or staff attached to the outermost part of a fender, and said rod must be vertical with respect to the ground.

If the rod should be inclined outwardly from the car it would project beyond the limits thereof and perhaps strike other objects; if it be inclined inwardly it would mislead the operator into believing that there was more clearance than actually existed, and a collision might result. If forwardly or rearwardly inclined, the resultant fore-shortening is a deceptive factor. Unless the rod be perfectly vertical, therefore, the fender guide fails in its purpose, and becomes a hazard to safe driving.

It has been heretofore proposed to provide for positioning the rod of a guiding attachment vertically by pivotally mounting said rod on a clamp which is fastened to the outer edge of a fender, said pivotal mounting permitting proper adjustment of the rod regardless of the inclination of the clamp. Such a device has employed a clamping means for attachment to a fender, and a separate pivot means between the clamp and the rod or staff for alignment of the latter with the vertical, and the installation of said device has therefore required two separate operations, and also separate tools.

It is an object of the present invention to provide a combined clamping and pivoting means for a guide rod, wherein a single draft means is employed to attach said rod to a fender and secure same vertically in position.

This is accomplished according to the present invention by providing a universal joint or coupling having members with extensions thereon which form clamping means for attachment to an automobile fender.

To permit a fender guide having a sight or target of different front and back portions to be properly used on either right or left fenders, said universal coupling for the upright rod is of a ball and socket type, and said rod may therefore be turned at will to bring the forward part of an unsymmetrical target to the front of the vehicle during installation of the device.

A feature of the present invention is the provision of an improved mounting bracket for a guide rod wherein no parts need be detached for installing said rod on a fender.

Another feature of the present invention is the provision of an improved mounting bracket for a guide rod having resilient means to provide for snapping said bracket on a fender curl and retaining the bracket thereon during installation leaving the hands free for tightening the draft means thereof.

A further feature of the present invention is the provision of an improved mounting bracket in a fender guide whereby the draft means for tightening said bracket to a fender curl is readily and easily accessible.

A still further feature of the present invention is the provision of an improved mounting bracket which is extremely compact and inconspicuous.

Other features and advantages will hereinafter appear.

In the accompanying drawing:

Figure 1 is a side view of a fender guide and mounting bracket constituting a now preferred form of the present invention, attached to an automobile fender.

Fig. 2 is a front view of the fender guide, the bracket parts and the fender being shown in section.

Figs. 3, 4, 5, 6, 7 and 8 are views each showing a different one of various bracket parts;

Fig. 9 is a modified form of bracket mounting according to the present invention.

The device of the present invention, in the exemplary embodiment thereof illustrated in the drawing, includes a staff 10, to be supported on an automobile fender 11, and having at its upper extremity a target 12 with a front portion 13 and a rear portion 14.

The staff 10 is provided at its lower end with a ball 15 having a stud 16 thereon oppositely disposed to said staff, said ball and stud forming part of a universal joint to provide for variable positioning of the staff 10 relative to the ground.

According to the present invention there are provided members which form part of the universal connection to the staff 10, said members being also adapted to clamp between them the curl of an automobile fender and to support thereby said staff and the target 12. Also, a single draft means is employed to draw said members together and at the same time to secure the staff 10 in proper vertical position and against casual movement.

Included in the shown means for accomplishing these purposes, are a socket and clamping member 17 and a cooperating bracket member 18, said members being preferably stamped and formed from sheet metal.

The member 17 includes a bottom portion established principally as a hemispherical cup 20, said cup having an aperture 21 therethrough of larger diameter than the stud 16.

The cup 20 fits closely the lower portion of the ball 15, forming a socket therefor, and permitting the staff 10 by virtue of the clearance between the stud 16 and the sides of the aperture 21, to assume, within limits, different radial positions about said ball as a center.

Above the cup 20, and beyond a pair of ears 22 at its sides, the member 17 continues upwardly as a straight vertical wall 23. At the top of this wall there is a horizontally extending lip 24 for engaging the inside of the fender 11 just above the curl.

The bracket 18 also includes a bottom hemispherical cup 26 formed therein, said cup having an aperture 27 in its bottom to receive the lower end portion of the stud 16, the aperture 27 being larger than the aperture 21 in the cup of the member 17.

Above the cup 26 the member 18 has a vertical portion 28; the member 18 being thence continued as a horizontal portion 29. Beyond the portion 29 is a leaf 30 making an angle of slightly less than 90 degrees with the portion 29.

A tongue 31 is punched from the vertical portion 28, to form an opening 32 there'n; said tongue extending horizontally from the portion 29 as a uniplanar extension thereof.

The tongue-carrying extension provided by the parts 29 and 31, together with the leaf 30 upstanding thereabove, form a bracket upon which the curled edge of the fender 11 rests and into which it fits.

The opening 32 of the bracket member 18 is sufficiently large to permit the lip 24 and vertical wall 23 of the clamping member 17 to be passed therethrough, and the ears 22 of said member 17 abut the vertical portion 28 of the member 18 when the guide is attached to a fender. Said ears provide means for fulcruming the member 17 on the member 18 to admit of relative rocking of said members.

For the purpose of urging the members 17 and 18 apart resiliently, a helical spring 33 is provided on the stud 16 and disposed between said members, and said spring is positioned between a cup washer 34 bearing against the convexity of the cup 20 in the clamping member 17, and a cup washer 35 bearing against the concavity of the cup 26 in the bracket member 18. In addition, the spring 33 serves to permit the fender gripping portions of the bracket and clamping member 17 and 18 to be urged apart for snapping same on the fender curl during installation, and said spring retains the bracket assemblage in position thereon so as to leave the hands free for tightening of the draft means thereof.

A nut 36 takes an external thread on the lower end of the stud 16, for the purpose of clamping the members 17 and 18 to a fender curl; a washer 37 being interposed between said nut and the cup 26 and said washer having one flat face and one concave face.

When it is desired to attach the fender guide to a car, the nut 36 is loosened, and the members 17 and 18 are snapped over the curl of the fender, said members being movable relative to each other by virtue of the clearance between the apertures 21 and 27 therein and the stud 16.

The staff 10 is then held vertically, and the nut 36 is tightened, thereby, while drawing the cupped portions of the members 17 and 18 together, to cause said members, at points removed from their cups, to grip the curl of the fender firmly. At the same time, the staff 10 is seized against casual movement by the friction grip between the ball 15 and the cup 20, between the washer 37 and cup 26, and also between the cup washers 34 and 35 and said cups. Preferably, the ball and the cup 20 are knurled as shown.

The position of the members 17 and 18 when attached to a fender will be largely determined by the particular shape of the curl in said fender, and said position will vary widely with different types of cars. Despite this variation however, the staff 10 may be moved to a vertical position relative to the ground, and may be fixed in said position, incidental to clamping the entire device to the fender by mere tightening of the single nut 36.

A modification of the present invention is shown in Fig. 9 wherein the members 17a and 18a are formed for positioning and directly coacting with a compression spring 33a disposed therebetween.

The clamping member 17a comprises a lip 24a, a vertical wall 23a, and below the latter a cup or socket 20a for accommodating the ball 15 of the staff 10. These parts correspond to the similarly numbered parts of Figs. 1 to 8. The socket 20a, however, is press formed to include an upper cylindrical portion 38, which is obliquely truncated as shown at 38', and a reduced lower cylindrical portion 39, there being a shoulder 40 joining said portions.

The bore of the cylindrical portion 39 of this socket 20a is sufficiently large so that a substantial clearance is had between the stud 16 and said bore, and therefore the staff 10 may be moved radially for alignment purposes.

The bracket member 18a comprises an upper leaf 30a, a horizontal portion 29a, forming with a struck-out tongue 31a an inwardly directed extension above a vertical portion 28a, and below the latter a cup or socket 26a having a central aperture 27a. These parts correspond to the similarly numbered parts of Figs. 1 to 8. The socket 26a, however, is press formed to such depth and diameter as to allow the parts to be assembled as illustrated when the device is tightened up. It will be noted that then this cup 26a somewhat telescopically surrounds the upper or larger diameter cylindrical portion of the cup or socket 20a of the clamping member 17a.

The stud 16 passes through the aperture 27a, the latter being substantially larger than the stud 16 for purposes of clearance to permit radial movement of the staff 10.

A helical compression spring 33a is disposed between the members 17a and 18a to resiliently urge these apart, said spring fitting over the cylindrical portion 39 of the member 17a.

For the purpose of drawing together the members 17a and 18a to clamp a fender curl, a nut 36 is provided on the stud 16, and interposed between said nut and the cupped portion 41 of the member 18a is a washer 37 having one flat face and one concave face.

There is thus provided by the present invention a simple and effective universally adjustable fender guide for automobiles having a mounting means permitting of alignment of the guiding staff with the vertical, and wherein a single draft means is employed to secure attachment to a fender and to fix in proper position said staff.

Variations and modifications may be made within the scope of this invention and portions of the improvements may be used without others.

I claim:

1. A fender guide including a staff; means for giving said staff a universal mounting, said means including a ball near the lower end of the staff, and a pair of bracket structures one crossing the other and rockable relative to the other; a socketing means for the ball wholly carried by one of said brackets; means partially carried by both bracket structures for clamping said mounting means to the edge of a fender when said bracket structures are relatively rocked; and means including a single draft member for rocking the rockable bracket relative to the other for causing said socketing means to grip said ball to hold same in any one of a plurality of possible angular adjustments of the staff relative to the ground level, the means last-mentioned operating thus to grip the ball when said draft member is operated to give said bracket structures relative movement to cause them to grip a fender edge to mount the fender guide on such fender.

2. A fender guide comprising a staff; a ball thereon; a plural-part bracket assemblage engaging said ball for supporting the staff in adjustable position on the outer edge of an automobile fender, said assemblage comprising two bracket structures shaped to grasp the curl of a fender, one of said structures having a receptor shaped to coact with said ball to afford the latter substantially a universal-joint mounting, said bracket structures fulcruming one on the other such that relative rocking of said structures causes mutual approach of the curl grasping portions thereof; and draft means for clamping the ball in the receptor, and at the same time for rocking said structures relatively to cause their curl grasping portions to grip the vehicle fender.

3. The invention as defined in claim 2, in which said draft means includes a threaded stud fixed to the ball; and a nut therefor.

4. The invention as defined in claim 2, in which one of said bracket structures has an opening therein through which the other bracket structure passes.

5. A guide attachment for fenders including a vertical rod; a ball thereon; a bracket engaging said ball for supporting the rod in adjustable position on the outer edge of an automobile fender, said bracket comprising two members shaped to grasp the curl of a fender, one of said members having a cup adapted to engage said ball as a socket therefor, the other of said members having a cup spaced from the first-mentioned cup but nesting the same therein, said members being relatively movable to move the cups toward each other and at the same time to move said curl grasping portions toward each other; and draft means for relatively moving said members to clamp the ball in the first-mentioned cup, and to cause the curl grasping portions of said members to grip the vehicle fender.

6. The invention as defined in claim 5, in which the portions of the cups which nestingly engage are cylindrical to allow one cup to telescopically move within the other.

7. A fender guide including a staff; a ball thereon; a plural-part bracket assemblage engaging said ball for supporting the staff in adjustable position on the outer edge of an automobile fender, said assemblage comprising two bracket structures shaped to grasp the curl of a fender, one of said structures having a receptor shaped to coact with said ball to afford the latter substantially a universal-joint mounting, said bracket structures fulcruming one on the other such that relative rocking of said structures causes mutual approach of the curl-grasping portions thereof; and means carried by the ball, and including a stud axially aligned with the staff, for clamping said ball in the receptor so that the ball and staff carried thereby may be adjustably turned about their common axis.

8. A fender guide including a staff; means for giving said staff a universal mounting and including a ball near the lower end of the staff; a pair of relatively movable brackets, one having at its upper portion a means for engaging the outer face of a fender and a means for engaging the underside of a fender curl on the bottom of the fender and on the inner side thereof, and the other bracket having at its upper portion a means for overlying and engaging the upper side of said fender curl; a socketing means for said ball wholly carried by one of said brackets; and means including a single draft means operable to cause said socketing means to grip said ball to hold the same in any one of a plurality of angular adjustments of the staff relative to the ground level, and for simultaneously relatively moving said brackets to cause them to grip the fender between the two first-mentioned means and the third-mentioned means.

9. The invention as defined in claim 8, in which one of said brackets has means abutting the other for fulcruming thereon to render said brackets relatively rockable, said draft means being operable to cause relative rocking of the brackets.

10. A fender guide including a staff; means for giving said staff a universal mounting and including a ball near the lower end of the staff; a pair of relatively movable brackets, one having at its upper portion a means for engaging the outer face of a fender and a means for engaging the underside of a fender curl on the bottom of the fender and on the inner side thereof, and the other bracket having at its upper portion a means for overlying and engaging the upper side of said fender curl; a socketing means for said ball wholly carried by one of said brackets, said socketing means including a cup having an aperture at its portion of maximum depth; and means including a single draft member passing through and laterally movable in said aperture and engaging the ball and operable to cause said socketing means to grip said ball to hold the same in any one of a plurality of angular adjustments of the staff relative to the ground level, and for simultaneously relatively moving said brackets to cause them to grip the fender between the two first-mentioned means and the third-mentioned means.

ARTHUR A. JOHNSON.